United States Patent
Folgoas et al.

(10) Patent No.: US 11,513,614 B2
(45) Date of Patent: Nov. 29, 2022

(54) WRITING INSTRUMENT SERVING AS A MECHANICAL REMOTE CONTROL FOR AN ELECTRONIC DEVICE

(71) Applicant: SOCIETE BIC, Clichy (FR)

(72) Inventors: Loic Folgoas, Anoixi (GR); Arnaud Bez, Anoixi (GR); Myriam Oger, Anoixi (GR)

(73) Assignee: SOCIÉTÉ BIC, Clichy (FR)

( * ) Notice: Subject to any disclaimer, the term of this patent is extended or adjusted under 35 U.S.C. 154(b) by 0 days.

(21) Appl. No.: 17/295,519

(22) PCT Filed: Nov. 21, 2019

(86) PCT No.: PCT/EP2019/082138
§ 371 (c)(1),
(2) Date: May 20, 2021

(87) PCT Pub. No.: WO2020/104613
PCT Pub. Date: May 28, 2020

(65) Prior Publication Data
US 2022/0011885 A1    Jan. 13, 2022

(30) Foreign Application Priority Data
Nov. 23, 2018 (EP) .................................. 18306566

(51) Int. Cl.
*G06F 3/0354* (2013.01)
*G06F 3/16* (2006.01)
(Continued)

(52) U.S. Cl.
CPC .......... *G06F 3/03545* (2013.01); *B43K 29/08* (2013.01); *G06F 3/167* (2013.01); *G08B 3/10* (2013.01)

(58) Field of Classification Search
CPC ...... G06F 3/03545; G06F 3/0354; G06F 3/02; G06F 3/017; G06F 3/16; G06F 3/167; G08B 3/10; B43K 29/08
See application file for complete search history.

(56) References Cited

U.S. PATENT DOCUMENTS 6,603,464 B1 * 8/2003 Rabin ................ G06V 30/1423
                                                    382/314
6,655,597 B1 * 12/2003 Swartz ............... G06K 7/10673
                                                    235/472.01
(Continued)

FOREIGN PATENT DOCUMENTS

EP          2762327 A1    8/2014

OTHER PUBLICATIONS

International Search Report and Written Opinion in International Application No. PCT/EP2019/082138, dated Jan. 29, 2020 (14 pages).

(Continued)

*Primary Examiner* — Vijay Shankar
(74) *Attorney, Agent, or Firm* — Bookoff McAndrews, PLLC

(57) ABSTRACT

A writing instrument having a plurality of retraction mechanisms, wherein each of the plurality of retraction mechanisms is configured to actuate a respective retractable writing tip, each retraction mechanism being configured to produce a different predetermined sound that is suitable for being detected by an electronic device, and each of the different predetermined sounds is configured to communicate a different command to the electronic device.

19 Claims, 1 Drawing Sheet

(51) Int. Cl.
    *B43K 29/08*     (2006.01)
    *G08B 3/10*     (2006.01)

(56) References Cited

U.S. PATENT DOCUMENTS

| | | |
|---|---|---|
| 8,149,227 B2 | 4/2012 | Marggraff et al. |
| 9,798,397 B2 * | 10/2017 | Oonishi ................ G06F 3/0412 |
| 11,104,179 B2 * | 8/2021 | Michenaud ............ B43K 24/12 |
| 11,216,082 B2 * | 1/2022 | Rolion ................ G06F 3/03545 |
| 2014/0222436 A1 | 8/2014 | Binder et al. |
| 2015/0302855 A1 | 10/2015 | Kim et al. |
| 2016/0048372 A1 | 2/2016 | Ozcan et al. |

OTHER PUBLICATIONS

European Search Report in European Patent Application No. 18306566, dated May 8, 2019 (7 pages).

* cited by examiner

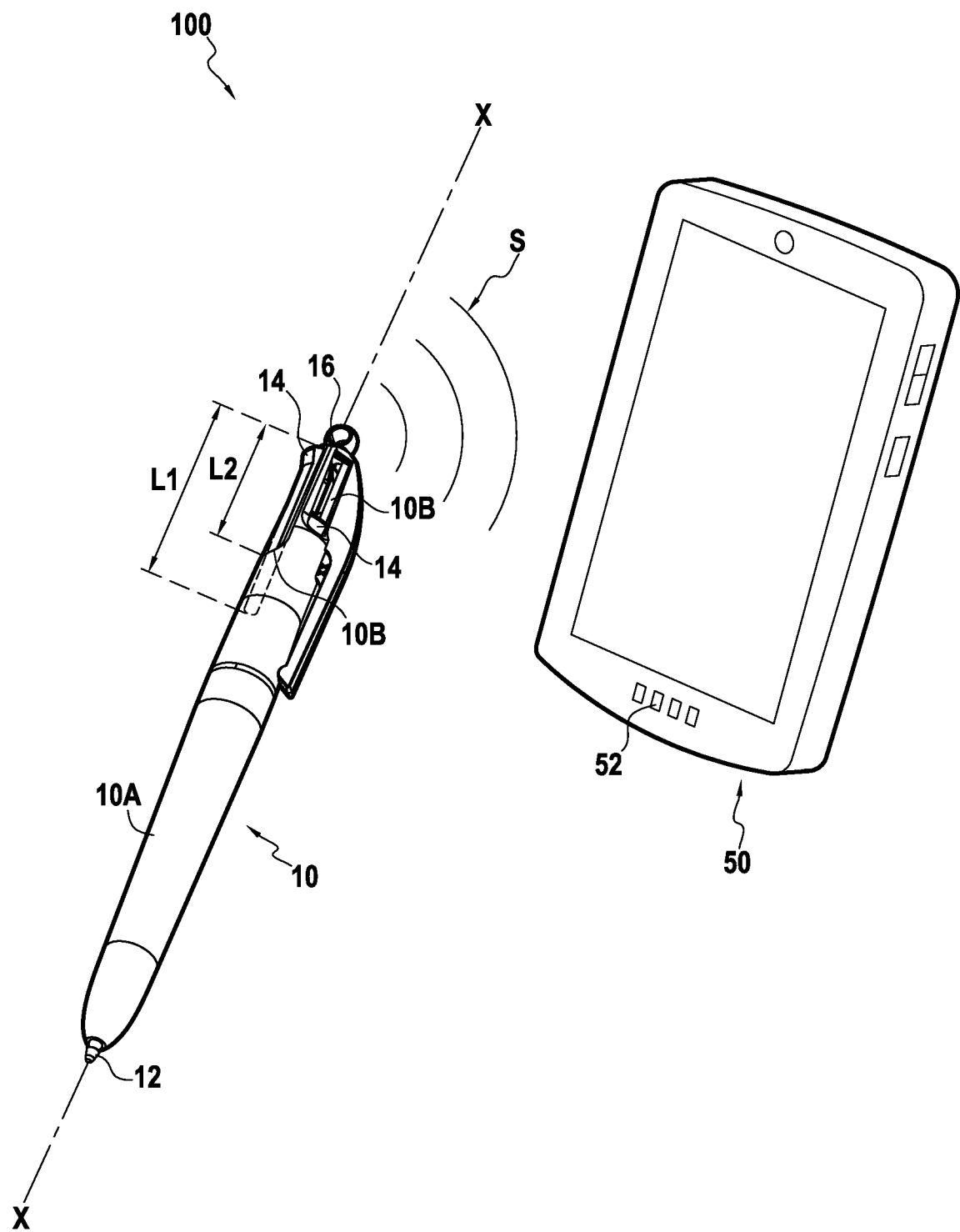

WRITING INSTRUMENT SERVING AS A MECHANICAL REMOTE CONTROL FOR AN ELECTRONIC DEVICE

This application is a national stage application of the International Application PCT/EP2019/082138, filed on Nov. 21, 2019, now published as WO2020104613, and which claims benefit from the European Patent Application EP 18306566.3, filed on Nov. 23, 2018.

The present disclosure relates to a writing instrument configured to make a command to an electronic device, a method for making a command to the electronic device with the writing instrument, and a system comprising the writing instrument and the electronic device.

BACKGROUND

Typically, electronic remote controls are provided to remotely send a command to an electronic device. However, such electronic remote controls are expensive, fragile, and need a power source such as a battery. As an alternative, some electronic devices can be configured to respond to a command that uses a human voice. However, such voice activated devices often require the user to adapt his/her pronunciation to the device. Further, such voice activated devices can be complex and expensive. Therefore, a need exists to simply the ability to remotely communicate with electronic devices.

SUMMARY

An embodiment relates to a writing instrument having at least one retraction mechanism for actuating a retractable writing tip, the retraction mechanism being configured to produce a predetermined sound that communicates a command to an electronic device.

The writing instrument comprises a single or several retractable writing tips. In the following, unless otherwise specified, "the writing tip" should be understood as "the at least one retractable writing tip".

The writing tip may be retractable with the help of any appropriate retraction mechanism known by the skilled person. For example, the retraction mechanism may comprise a button. The retraction mechanism may be actuated by a user in order to extend or retract the writing tip from/into a barrel of the writing instrument in order to place the writing tip in a writing or retracted position. According to the present disclosure, "actuating" a retractable writing tip means moving the writing tip from the retracted position to the extended position or from the extended position to the retracted position.

It should be understood that the writing tip may be formed as a felt tip, a ballpoint tip, a mechanical pencil tip, a graphite pencil tip, a chalk tip, or any other tip suitable for writing on a substrate. It is also envisioned that a brush, an eraser, a friction body, a pad (active or passive) for a touch screen (e.g. capacitive, resistive, inductive, infrared, optical, electrostatic, etc. screen), a cosmetic applicator (makeup brush, pencil, mascara brush, roll-on applicator, lipstick, or any other means for applying cosmetics), a laser pointer, etc., may also be used.

In the present disclosure, the word "electronic device" designates any smartphone, computer, pad, or electronic apparatus which can be remotely controlled.

The sound produced by the actuation mechanism of a "click pen" or similar retractable writing instrument is usually loud enough to be heard at a certain distance. In designing an actuation mechanism that always produces the same sound (e.g., same intensity, frequency content, etc.) when actuated, it is possible to use this sound as an acoustic command to activate an electronic device. For example, the command may be used as a trigger to start/stop a music or video player, take a photo, change a slide of a PowerPoint® document, etc. Therefore, the writing instrument according to the present disclosure may be, when used in combination with an electronic device, a mechanical or acoustical remote control. Such a remote control is more cost efficient and reliable than the electronic remote controls of the prior art. Additionally, this acoustical remote control is also easier to use than the voice activated devices because a user does not need to learn how to pronounce keywords for a voice command. Additionally, the electronic device does not need to be as complex as the devices that use a voice command, and thus more cost efficient.

In some embodiments, the writing instrument may comprise a plurality of retraction mechanisms, wherein each of the plurality of retraction mechanisms may be configured to actuate a respective retractable writing tip. Each retraction mechanism may be configured to produce a different predetermined sound. Each of the different predetermined sounds may be configured to communicate a different command to the electronic device.

In other words, the writing instrument may comprise two or more retraction mechanisms, each retraction mechanism actuating a distinct writing tip and producing a different predetermined sound. Therefore, with the same writing instrument, it is possible to have two or more different commands. In other words, a multifunction writing instrument may form a complex remote control.

In some embodiments, each of the plurality of retraction mechanisms may comprise a button. The length of each button and/or the length of the actuating path of each button may be different from each other in order to produce different predetermined sounds.

It is understood that the buttons may be the main elements which produce the sounds. Each button may extend along a length, for example the length is defined in a direction along the axis of the writing instrument. Varying the length of the different buttons may result in the buttons producing different sounds. Similarly, each button is moved along a path, for example along the axis of the writing instrument, in order to actuate the writing tip. Varying the length of the path of the different buttons may result in the buttons producing different sounds. For example, the buttons may be side buttons that cooperate with the barrel and with each other.

In some embodiments, the at least one retraction mechanism may be provided with a shock absorber.

A shock absorber can control the emitted sound. For example, the shock absorber may be formed by a spring or an elastomeric stop or ring, or any king of sound damper. For example the shock absorber may be provided on the button or as a stop for the button.

In some embodiments, each retraction mechanism may be provided with a different shock absorber in order to produce different predetermined sounds.

Providing different shock absorbers is an easy way to produce different predetermined sounds.

An embodiment also relates to a method for commanding an electronic device with a writing instrument according to the present disclosure, the method comprising: placing the writing instrument in a sound capture area of the electronic device, and producing the predetermined sound to command the electronic device by actuating at least one of the retraction mechanisms.

An embodiment also relates to a system comprising a writing instrument according to the present disclosure and an electronic device, the electronic device comprising a sound sensor and a central processing unit configured to identify the predetermined sound and to execute a predetermined action in the electronic device.

For example, the predetermined action is to start/stop a music/video player, to take a photo, to change a slide of a PowerPoint® document, etc.

BRIEF DESCRIPTION OF THE DRAWINGS

The disclosure can be better understood by reading the detailed description of various embodiments given as non-limiting examples. The description refers to the accompanying sheets of figures, in which:

FIG. 1 shows a system comprising a writing instrument and an electronic device.

DETAILED DESCRIPTION

Referring to FIG. 1, a system 100 comprising a writing instrument 10, such as a multifunction writing instrument, and an electronic device 50, such as a smartphone.

The electronic device 50 has a sound sensor 52, for example a microphone, and central processing unit (CPU) which is not shown and is located inside the casing of the electronic device 50.

The writing instrument 10 may have four writing tips 12. In the exemplary embodiment shown in FIG. 1, one writing tip 12 is in the extended position while the three other writing tips are in the retracted position, and thus hidden in the barrel 10A. Each writing tip 12 may be associated with a corresponding retraction mechanism 14, for example a side button 14. In other words, the writing instrument 10 may have four writing tips 12 and four retraction mechanisms 14, each retraction mechanism 14 may be configured to actuate a different writing tip 12. Each retraction mechanism 14 may be configured to produce a different predetermined sound S. Only two buttons 14 are visible in FIG. 1, the other two buttons are disposed on the opposing side of the writing instrument and hidden from view.

The side buttons 14 may extend along the axis X of the writing instrument 10, a length L1 along the axis X of each button 14 being different. Each button 14 may be placed in a side window 10B extending along the axis X. The length L2 of each window 10B along the axis X may be different, so that the length of the actuating path of each button is different. In addition, the rear edge of each window 10B may be provided with a shock absorber 16. The shock absorber 16 may be formed as a stop made of elastomer. Further, each shock absorber 16 may be different (e.g., by its shape and/or material and/or density).

When a button 14 is moved in order to actuate the corresponding writing tip 12, a predetermined sound S is produced. When the writing instrument 10 is placed in the sound capture area of the electronic device 50, for example within a radius of 5 meters from the electronic device 50, the predetermined sound S is received by the sound sensor 52 of the electronic device 50. The central processing unit of the electronic device 50 can thus identify the predetermined sound S and execute a predetermined action in the electronic device 50. For example, the user may customize the configuration of the electronic device 50 in order to link a sound S with a particular command to open an app on the electronic device 50. For example, the writing instrument 10 may have four retraction mechanisms 14 (and thus able to produce four different predetermined sounds S), the user may configure the electronic device 50 to capture a photo when a first predetermined sound is emitted, capture a video when a second predetermined sound is emitted, send the captured photo or video via email when a third predetermined sound is emitted and send the captured photo or video via SMS then a fourth predetermined sound is emitted. Additionally, the electronic device 50 may include a filter or algorithm to facilitate detecting the predetermined sound S. For example, the electronic device 50 may be configured to include a bandpass filter. The electronic device 50 may be configured to perform a LOFAR or DEMON analysis.

Although the present disclosure is described with reference to specific examples, it is clear that modifications and changes may be made to these examples without going beyond the general scope of the invention as defined by the claims. In particular, individual characteristics of the various embodiments shown and/or mentioned may be combined in additional embodiments. Consequently, the description and the drawings should be considered in a sense that is illustrative rather than restrictive.

Additionally, all of the disclosed features of an apparatus may be transposed, alone or in combination, to a method and vice versa.

The invention claimed is:

1. A writing instrument comprising a plurality of retraction mechanisms, wherein each of the plurality of retraction mechanisms is configured to actuate a respective retractable writing tip, and the actuation of each retraction mechanism is configured to produce a different predetermined sound that is suitable for being detected by an electronic device,
wherein the plurality of retraction mechanisms comprises a first retraction mechanism and a second retraction mechanism, and
wherein the actuation of the first retraction mechanism is configured to emit a first predetermined sound commanding the electronic device to capture a photo or video, and the actuation of the second retraction mechanism is configured to emit a second predetermined sound commanding the electronic device to send the photo or video via SMS or email.

2. The writing instrument according to claim 1, wherein each of the plurality of retraction mechanisms comprises a button, and a length of each button and/or a length of the actuating path of each button is different from each other in order to produce the different predetermined sound.

3. The writing instrument according to claim 2, wherein each retraction mechanism is provided with a different shock absorber in order to produce the different predetermined sound.

4. A method for commanding an electronic device with the writing instrument according to claim 1, the method comprising:
placing the writing instrument in a sound capture area of the electronic device, and
producing the different predetermined sound to command the electronic device by actuating at least one of the plurality of retraction mechanisms.

5. A system comprising the writing instrument according to claim 1 and an electronic device, the electronic device comprising a sound sensor and a central processing unit configured to identify the different predetermined sound and to execute a predetermined action in the electronic device.

6. A writing instrument comprising a plurality of retraction mechanisms, wherein each of the plurality of retraction mechanisms is configured to actuate a respective retractable writing tip, and the actuation of each retraction mechanism is configured to produce a different predetermined sound that is suitable for being detected by an electronic device, wherein each of the plurality of retraction mechanisms comprises a button, and a length of each button and/or a length of the actuating path of each button is different from each other in order to produce the different predetermined sound.

7. The writing instrument according to claim 6, wherein each different predetermined sound is configured to communicate a different command to the electronic device.

8. The writing instrument according to claim 7, wherein the different commands to the electronic device includes a first command to capture a photo and a second command to capture a video.

9. The writing instrument according to claim 6, wherein each retraction mechanism is provided with a different shock absorber in order to produce the different predetermined sound.

10. A writing instrument comprising a plurality of retraction mechanisms, wherein each of the plurality of retraction mechanisms is configured to actuate a respective retractable writing tip, each retraction mechanism being configured to produce a different predetermined sound that is suitable for being detected by an electronic device.

11. The writing instrument according to claim 10, wherein each different predetermined sound is configured to communicate a different command to the electronic device.

12. The writing instrument according to claim 10, wherein each of the plurality of retraction mechanisms comprises a button, the length of each button and/or the length of the actuating path of each button is different from each other in order to produce different predetermined sounds.

13. The writing instrument according to claim 10, wherein each retraction mechanism is provided with a different shock absorber in order to produce different predetermined sounds.

14. A method for commanding an electronic device with the writing instrument according to claim 10, the method comprising:

placing the writing instrument in a sound capture area of the electronic device, and producing the different predetermined sound to command the electronic device by actuating at least one of the plurality of retraction mechanisms.

15. The method according to claim 14, when the writing instrument has four retraction mechanisms, the method further comprising:

capturing a photo when a first predetermined sound is emitted, capturing a video when a second predetermined sound is emitted, sending the captured photo and/or video via email when a third predetermined sound is emitted, and sending the captured photo and/or video via SMS when a fourth predetermined sound is emitted.

16. A system comprising the writing instrument according to claim 10 and an electronic device, the electronic device comprising a sound sensor and a central processing unit configured to identify the different predetermined sound and to execute a predetermined action in the electronic device.

17. The system according to claim 16, comprising a writing instrument having four retraction mechanisms, wherein the electronic device is configured to capture a photo when a first predetermined sound is emitted, capture a video when a second predetermined sound is emitted, send the captured photo and/or video via email when a third predetermined sound is emitted, and send the captured photo and/or video via SMS when a fourth predetermined sound is emitted.

18. The writing instrument according to claim 10, comprising four retraction mechanisms.

19. The writing instrument according to claim 10, wherein the actuation of each retraction mechanism is configured to produce one of a plurality of different predetermined sounds that is suitable for being detected by the electronic device.

\* \* \* \* \*